United States Patent
Agrawala et al.

(10) Patent No.: US 7,458,029 B2
(45) Date of Patent: Nov. 25, 2008

(54) SYSTEM AND PROCESS FOR CONTROLLING A SHARED DISPLAY GIVEN INPUTS FROM MULTIPLE USERS USING MULTIPLE INPUT MODALITIES

(75) Inventors: Maneesh Agrawala, Seattle, WA (US); Sumit Basu, Seattle, WA (US); Steven M. Drucker, Bellevue, WA (US); Ronald Keith Logan, Everett, WA (US); Trausti Thor Kristjansson, Redmond, WA (US); Tim Paek, Sammamish, WA (US); Kentaro Toyama, Redmond, WA (US); Andrew David Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 10/758,574

(22) Filed: Jan. 15, 2004

(65) Prior Publication Data

US 2005/0198578 A1     Sep. 8, 2005

(51) Int. Cl.
    G06F 13/00     (2006.01)
    G06F 15/00     (2006.01)

(52) U.S. Cl. ...................... 715/744; 715/764
(58) Field of Classification Search ......... 715/744–745, 715/762–765, 853–855, 760
See application file for complete search history.

(56) References Cited

U.S. PATENT DOCUMENTS 6,007,162 A    12/1999   Hinz et al.
6,343,313 B1 *   1/2002   Salesky et al. .............. 709/204
2003/0145283 A1 *   7/2003   Machida et al. ............. 715/513

(Continued)

FOREIGN PATENT DOCUMENTS

EP     0394614 A2    10/1990

(Continued)

OTHER PUBLICATIONS

Benford, S., B. B. Bederson, K.-P. Åkesson, V. Bayon, A. Druin, P. Hansson, J. P. Hourcase, R. Ingram, H. Neale, C. O'Malley, K. T. Simsarian, D. Stanton, Y. Sundblad, and G. Taxén, Designing storytelling technologies to encourage collaboration between young children, *HCIL Technical Report* No. 99-28, Nov. 1999.

(Continued)

*Primary Examiner*—Kevin Nguyen
(74) *Attorney, Agent, or Firm*—Lyon & Harr, LLP; Richard T. Lyon

(57) ABSTRACT

A system and process for controlling common information displays, referred to as shared displays, is presented. The system and process allows multiple modes of input using a set of modules that accept and display data from a variety of sources. Input modules are able to understand data from a single mode of communication and to be able to generate messages as output accordingly. An optional translation module takes discrete message units and converts them into commands or requests that can be processed by a logic module. The logic module includes any application that is running on the shared display. A layout module lays out the information output by the logic module and a display module takes the layout data and converts the information to a form that can be readily displayed on a display device.

33 Claims, 3 Drawing Sheets

U.S. PATENT DOCUMENTS

2005/0066284 A1* 3/2005 Ho et al. .................... 715/762
2006/0031779 A1* 2/2006 Theurer et al. .............. 715/781

FOREIGN PATENT DOCUMENTS

WO        WO-0195103 A2    12/2001
WO        WO-03083717 A1    10/2003

OTHER PUBLICATIONS

Bier, E. A., and S. Freeman, MMM: A user interface architecture for shared editors on a single screen, *Proceedings of User Interface and Software Technology (UIST 91)*, ACM Press, 1991, pp. 79-86.

Christian, A., B. Avery, Digital Smart Kiosk Project, *Proceedings of the CHI '98 Conference on Human Factors in Computing Systems*, 1998, 155-162.

Churchill, E. F., L. Nelson, and L. Denoue, Designing digital bulletin boards for social networking, *Proc. Workshop Public, Community and Situated Displays at CSCW 2002*, New Orleans.

Crane, M., D. MacDonald, S. Minneman, and J. Winet, Sunset boulevard, ACM Siggraph'97 Visual Proceedings: The art and interdisciplinary programs of Siggraph'97, Los Angeles, California, 1997, p. 102.

Foster, G. and M. Stefik, Cognoter: Theory and practice of a colaborative tool, *Proceedings of the Conference on Computer-Supported Cooperative Work* (CSCW '86), Austin, Texas, ACM Press, pp. 7-15. 1986.

Grasso, A., F. Roulland, D. Snowdow, M. Muehlenbrock, Supporting informal communication across local and distributed communities, *Workshop on Public, Community and Situated Displays at CSCW 2002*.

Greenberg, S, M. Rounding, The notification collage: Posting information to public and personal displays, *CHI Letters*, ACM Press, 3(1): pp. 515-521. (20011).

Izadi, S., H. Brignull, T. Rodden, Y. Rogers, M. Underwood, Dynamo: A public interactive surface supporting the cooperative sharing and exchange of media, *Proceedings of the 16th annual ACM Symposium on User Interface Software and Technology*, Vancouver, Canada, 2003, pp. 159-168.

MacIntyre, B., E. D. Mynatt, S. Voida , K. M. Hansen , J. Tullio , G. M. Corso, Support for multitasking and background awareness using interactive peripheral displays, *Proceedings of the 14th Annual ACM Symposium on User Interface Software and Technology*, Orlando, Florida, Nov. 11-14, 2001.

Morris I., A. Wilkie, P. Sepulveda, Flowershow, http://www.satellite-b.co.uk/flowershow.html, 2000.

Myers, B., H. Stiel , R. Gargiulo, Collaboration using multiple PDAs connected to a PC, *Proceedings of the 1998 ACM Conference on Computer Supported Cooperative Work*, Seattle, Washington, United States, Nov. 14-18, 1998, p. 285-294.

Mynatt, E. D., T. Igarashi, W. K. Edwards, A. LaMarca, Flatland: new dimensions in office whiteboards, *Proceedings of the SIGCHI Conference on Human Factors in Computing Systems: The CHI is the Limit*, Pittsburgh, Pennsylvania, United States, May 15-20, 1999, pp. 346-353.

Paradiso, J. A., C. K. Leo , N. Checka , K. Hsiao, Passive acoustic knock tracking for interactive windows, *CHI '02 Extended Abstracts on Human Factors in Computing Systems*, Minneapolis, Minnesota, Apr. 20-25, 2002.

Pedersen, E. R., K. McCall, T. P. Moran, F. G. Halasz, Tivoli: An electronic whiteboard for informal workgroup meetings, *Proceedings of the SIGCHI Conference on Human Factors in Computing Systems*, Amsterdam, The Netherlands, Apr. 24-29, 1993, pp. 391-398.

Geary, D., Graphic Java 2, vol. 1, AWT, 3rd Edition, Published Sep. 21, 1998 by Prentice Hall.

Hourcade, J. P. and B. Bederson, Architecture and implementation of a Java package for multiple input devices (MID), Tech Report HCIL—99—08, Comp. Sci. Dept., Univ. of Maryland, College Park, MD, 1999.

Stewart, J., J. B. Bederson, and A. Druin, Single display groupware: A model for co-present collaboration, Proc. of the ACM Conf. on Human Factors in Computing Sys. (CH799), pp. 286-293, ACM Press, New York, NY, 1999.

European Search Report, mailed Sep. 4, 2007, search completed Jul. 9, 2007.

\* cited by examiner

SYSTEM AND PROCESS FOR CONTROLLING A SHARED DISPLAY GIVEN INPUTS FROM MULTIPLE USERS USING MULTIPLE INPUT MODALITIES

BACKGROUND

1. Technical Field

The invention is related to the control of shared displays, and more particularly to a system and process for controlling a shared display based on inputs from multiple users using multiple input modalities.

2. Background Art

There are a variety of scenarios in which a number of individuals share a common information display that is often referred to as a shared display. Examples of shared displays include movie theater screens, meeting room projection screens, flight-information kiosks at airports, and large outdoor displays as can be found in Times Square or Piccadilly Circus. Further, conferences, conventions, talks and demonstrations are almost always accompanied by a large shared display for the audience; certain retail segments, such as coffee shops and bars cater to audiences using shared displays; and advertisers have been putting up shared displays in large public spaces as a way to host ads with richer media content. In all of these scenarios, the possibility of audience interaction with the shared display would add additional functionality and excitement. Unfortunately, today, the majority of these displays are not interactive; that is, the viewers have no influence on what is displayed.

Some exceptions to this rule are emerging however, where shared displays are interactive. For example, electronic notice boards are starting to appear in communal areas of organizations and public places in lieu of the traditional bulletin boards where people would post paper copies of information they wanted to share with others. Essentially, an electronic notice board is a large display screen that is available for a user to electronically display notices and the like. The information is either posted to the board remotely from a user's desktop PC via a network having the notice board as one of its endpoints, or via directly-connected input devices located in the vicinity of the board.

Another example of an interactive shared display environment involves the use of single display groupware. Such systems employ a large communal display device and allow multiple users to concurrently interact with a shared application that outputs to the display. Typically, each user inputs to the shared application via a wired or wireless input device such as a computer mouse.

Examples of shared display environments that allow user interaction via their cell phones include a large LCD screen currently located in the Lisbon office of Vodafone. The LCD screen includes news headlines and short animations, and invites visitors to play interactive games. More particularly, a user is prompted to dial a number on their cell phone and then interact via Short Message Service (SMS) text messaging to play solo or against another person in the vicinity. Another example is the BBCi Studio street-level window displays in London which allow passersby to see and hear interviews in progress and submit their own questions by using their cell phone and SMS text messaging. The questions appear on a large display screen on the back wall of the studio.

However, even these interactive shared displays are quite limited in the ways a user can interface with the application associated with the display. For instance, only a single mode of input is typically supported. This is unfortunate as allowing multiple modes of input into the shared display would result in a greater percentage of the audience being able to participate. In addition, the existing interactive shared display environments are typically implemented as custom solutions, which cannot be adapted to other shared display applications.

SUMMARY

The present invention is directed toward a system and process for controlling a shared display that allows inputs to be received from a variety of input sources, processed accordingly, laid out, and displayed on the shared display. In this way, a number of people using different types of input devices can interact with a shared display.

More particularly, the present invention is directed toward a system and process for controlling a shared display that is embodied in a computer program having the following modular architecture. First, there are a number of input modules each providing a different communication modality that multiple users can employ to input information to the shared display system. In this way a variety of input devices can be employed, thereby encouraging a greater percentage of the audience of the shared display to participate in an application running on the display. The communication modalities include email, short message service (SMS) text messaging, instant messaging (IM), DTMF tones, voice, keyboard output signals, pointing device output signals, still camera output signals, and video camera output signals, among others. It is noted that some of these communication modalities exhibit latencies greater than about 1.0 second.

It is believed the present invention is the first shared display control system or process that accommodates inputs via multiple communication modalities where at least one of them is characterized by a latency of greater than about 1 second.

In some embodiments of the present system and process, a translation module is included that takes the user-inputted information and converts it into commands or requests that are recognizable to a logic module, when the inputs are not already in a form recognizable to this module. The logic module is essentially an application running on the shared display, which based on the user-inputted information, generates display instructions and data pertaining to the running the application. Examples of such applications include a computer game, electronic bulletin board, voting/polling tool, web browsing tool, and a computer graphics program. The logic module provides its output to a layout module, which based on this output, generates layout instructions and packages the data for the shared display. Finally, a display module receives the layout instructions and data from the layout module and employs the same to display content on a display device.

The foregoing represents the general architecture of the present shared display system and process. However, several variations are possible which can be advantageous for some applications. For example, the translation function could be incorporated directly into the logic module, thereby eliminating the need for a separate translation module. In addition, having a single translation module that all the input modules feed data into may result in the need for an overly complex translation module due to the diversity of the communication modalities associated with the inputs modules. In such cases, multiple translation modules can be included, each of which is tailored for a different input module. Further, rather than using independent translation modules in this manner, the translation function could be incorporated into the input modules themselves. It is noted that in some cases, the information input by a user via a particular communication modality will already be in a form recognizable to the logic module. In such cases the translation module or translation function can be eliminated.

Another useful variation in the general architecture of the present system and process involves adding an output function to one or more of the input modules. This output submodule receives data from the logic module and outputs it to a user. For example, the user would specify in a message input into one of the input modules what data to output from the logic module and which input module having an output submodule the data is to be output from. Thus, the user could specify the data be provided via a different communication modality in comparison to the request, if that is desired. It is noted that any type of data could be requested and provided, such as an image file, video file, audio file, document file, or a text message. Note further that output messages can occur in broadcast mode where all known viewers of a shared display receive the same message, or they may occur in private or group mode, where subsets of viewers receive different messages.

Since multiple users can provide inputs to the system via different communication modalities (and so via different ones of the input modules) at the same time, there is a possibility of collisions and data loss. To prevent this, the input modules can be required to append timestamps onto each message before providing it to the translation of logic module. The translation or logic module would then queue incoming data from the input modules and process them based on their timestamps. Another way to handle this issue involves modifying the general architecture described above in order to allow cross-communication between the input modules. In this version of the system, the incoming data from the users is still time stamped. However, in this case each input module coordinates with the other input modules to provide each message to the translation or logic module only after any message received by another input module with an earlier timestamp has been provided first.

The modules of the present shared display system and process can also be generalized, with the exception of the logic module, so as to operate with a variety of different applications. In this way, logic modules associated with different applications can be simply swapped in and out, without having to change the other modules. In addition, the layout and display modules can be generalized so as to operate with a variety of different display devices. However, making the modules versatile enough to handle a variety of applications and display devices may make them overly complex and expensive in situations where this versatility is not necessary. Thus, another approach can be taken. Essentially, the modules can be made specialized to a specific type of application or display device. If support for other applications or display devices are required, the specialized modules would be swapped out for other modules capable of handing the desired application or display device.

The input modules can be configured to extract desired information from an incoming message prior to providing it to the translation or logic module. This is accomplished by having the input modules parse messages received from a user into discrete message units according to a prescribed parsing pattern. The specific pattern employed will depend on the communication modality and what information is needed to run the application. Only those message units will be forwarded to the logic module that are designated as containing information useful to the application running on the shared display. An example of what information might be parsed out in this manner is the identity of the user. Other examples include text, image data, video data, audio data, and documents.

The logic module can also be configured for archiving information in addition to running the application. This archived information can be used for feedback and data mining purposes, among others. For example, the information input by a user can be archived, as well as the identity of the user and when the information was provided. Similarly, in the case where a user requests information from the system, what information was requested, by whom, and when can be archived, as well as what data was actually provided to the user. In addition, each unique screen shown on the shared display can be saved.

Other useful features that can be implemented in the present shared display system and process include having the logic module provide display instructions with priorities specifying which data is to be displayed before other data whenever there is not enough space on the shared display to display all the data provided. In addition, the logic module can provide display instructions with time limits specifying the length of time data is to be displayed on the shared display, and can provide instructions with hard and soft constraints pertaining to the way the data should be laid out on the shared display. Still further, the logic module can be configured to accept commands from a user that affect the settings and operations of the application running on the shared display. These types of commands would only be processed if the user was found to be authorized to make changes to the application. This feature can be implemented by first determining if the information input by the user includes a command that has been designated as requiring special permission to execute. If so, the user inputting the information is identified, and it is determined if the user is on a pre-established list of users with special permission to submit such a command. The command is executed only if the user is on the list.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
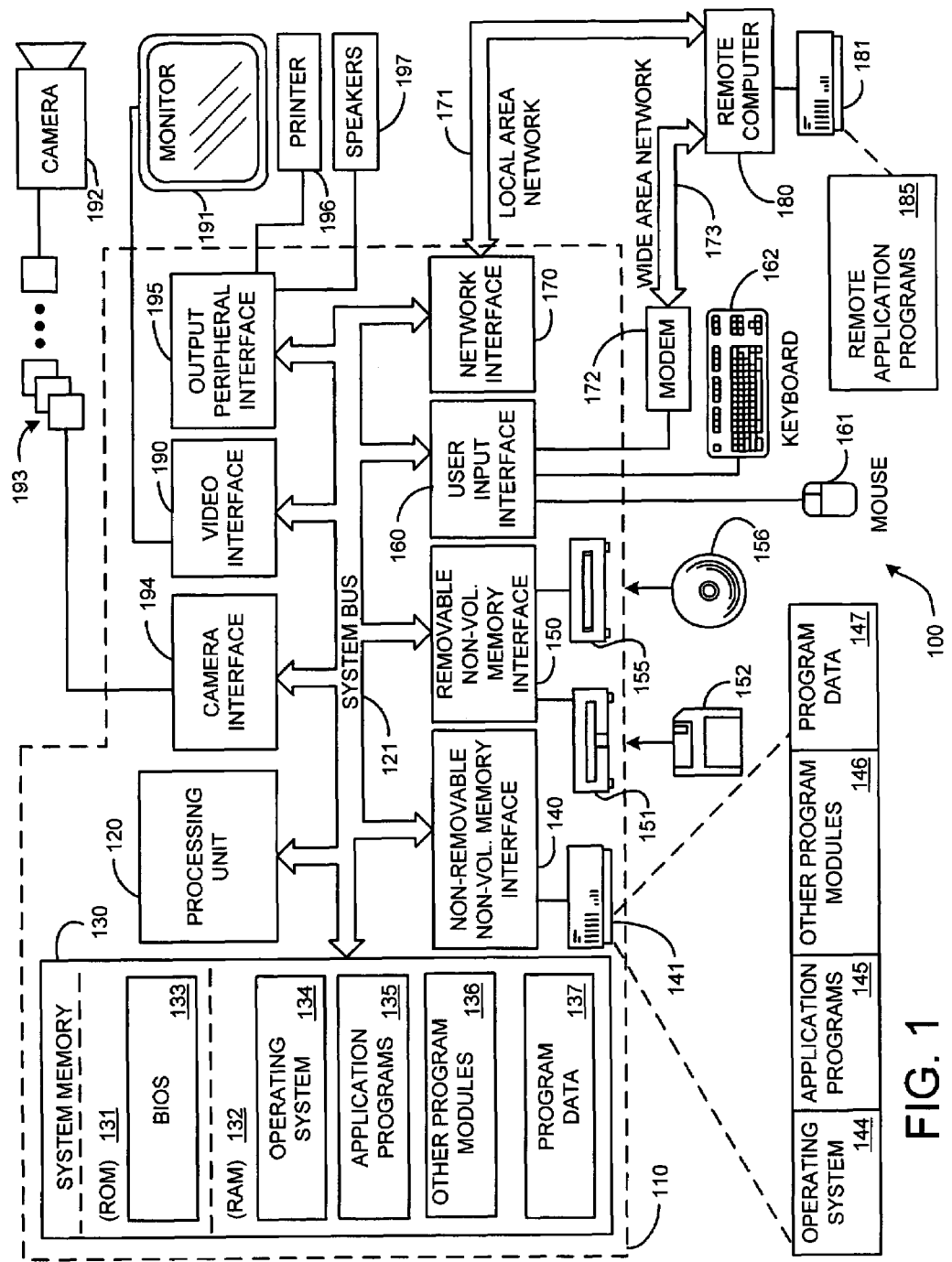
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 System and Process for Controlling a Shared Display

Figure 2:
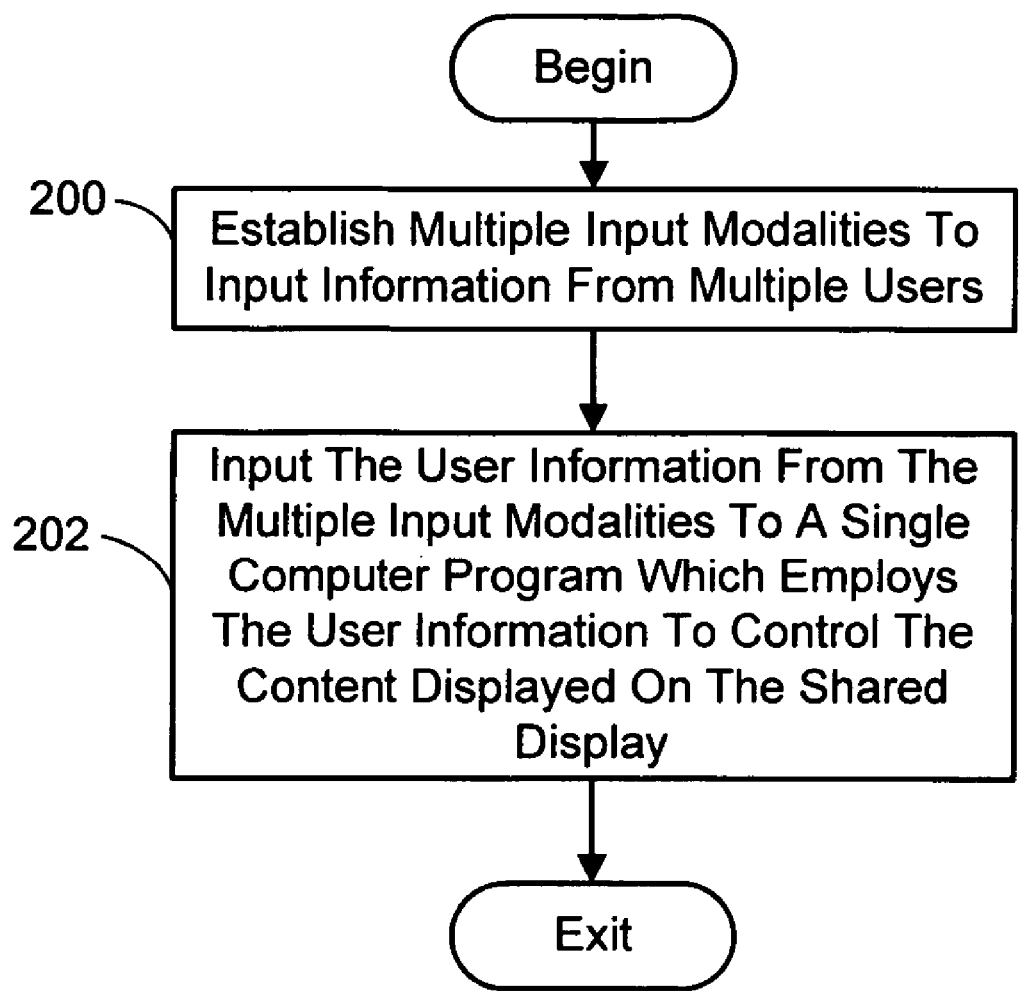
FIG. 2 is a flow chart diagramming an overall process for controlling a shared display.

The exemplary operating environment having now been discussed, the remaining part of this description section will be devoted to a description of the program modules embodying the invention. Generally, the system and process according to the present invention involves controlling a shared display. In general, this is accomplished via the following process actions, as shown in the high-level flow diagram of FIG. 2:

a) establishing multiple input modalities to input information from multiple users (process action 200); and, b) inputting the user information from the multiple input modalities to a single computer program which employs the user information to control the content displayed on the shared display (process action 202).

2.1 General Architecture

Figure 3:
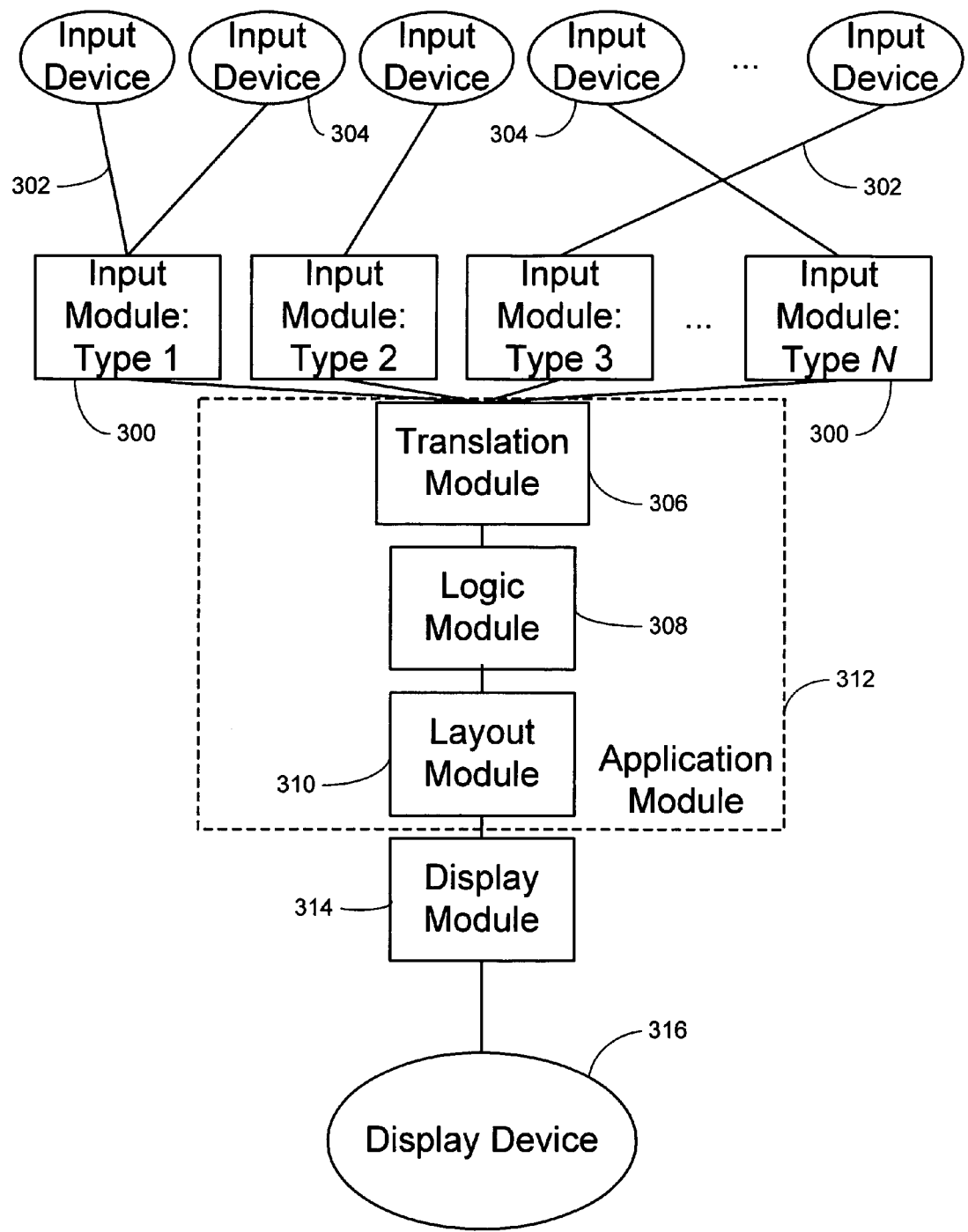
FIG. 3 is a block diagram illustrating a general embodiment of the computer program architecture employed to implement the process of FIG. 2.

One embodiment of the unique architecture employed to implement the foregoing process is shown in FIG. 3. In this embodiment, input 302 is received from a variety of input devices 304 into a bank of input modules 300, each of which handles a different type of communication modality. The input modules 300 process the inputs 302 and provide the processed data to a translation module 306. The translation module in turn prepares the data for input to a logic module 308. The logic module then provides display instructions and data pertaining to running an application to a layout module 310. The translation, logic and layout modules 306, 308, 310 can be collectively referred to as the application module 312. The layout module 310 sends layout instructions and packaged data to a display module 314, which controls the content displayed on the display device 316. Each of the aforementioned devices and program modules will be described in more detail in the sections to follow.

2.1.1 Input Devices and Modules

In general, each input module is designed to understand data from a single mode of communication. Thus, each input module is designed to accept input from any input device that communicates via a particular input modality. Examples of the communication modes that can be supported include, but are not limited to, e-mail, SMS text messaging, instant messaging (IM), DTMF tones, voice, keyboard input, mouse/joystick or any other pointing device input, camera-based input, video-camera input, and so forth. Accordingly, the input devices involved can include any of the computing devices described previously such as hand-held or laptop/notebook computing devices, as well as personal digital assistant (PDA) devices, cell phones, standard telephones, digital cameras and video cameras, or devices combining two or more of the foregoing.

Each input module reads the data coming in through its input channel. This data can include text, images, video, audio, document files, as well as other electronic media. In one embodiment, the data is parsed into discrete message units of content which are then passed to the translation module (as user text, image, video, audio or document data). The particular parsing pattern will depend primarily on the type of input and what information is required to control the shared display. For example, in the case of an email input where text in the email is to be displayed on the shared display, it might be dictated that the text be included in the "subject" line. In such a case the parsing would include extracting the contents of the subject line as a separate message unit (or units depending on the size). Capturing the identity of the person providing the input may also be important for display or other purposes as will be described later. Thus, it the case of an email input, the contents of the "From" line could be parsed to generate a message unit.

2.1.2 Translation Module

The translation module takes discrete message units provided by the input modules and converts them into commands or requests that can be processed by the logic module. In some cases, a translation module may be unnecessary, or it may itself perform no processing, simply passing message units as they come in to the logic module. For example, in the foregoing case where the input is an email and the subject line contains the text that is to be displayed, the parsed text can be transferred directly to the logic module. However, in other applications, translation would be required. For instance, assume that the input modality is a SMS text message which in its raw form would typically be a string of numbers or symbols generated using a keypad of a device producing such messages (e.g., a cell phone). In such a case the translation module is used to convert the number/symbol string into text that can be acted upon by the logic module and ultimately shown on the shared display.

2.1.3 Logic Module

The logic module consists of any application running on the shared display. Examples of these applications include a game, a bulletin board, a voting tool, a web-browsing tool, an application for creative graphics, and so forth. Software applications of just about any type can be implemented in the logic module, as long as they are modified to make sense for asynchronous inputs received from multiple people. Thus, for example, a game of solitaire might be modified to allow a room-full of people to cooperatively play a game, rather than assuming that a single player is fully in control of the game. The logic module outputs its data to a layout module, with optional auxiliary information which assigns data priorities, time limits, layout suggestions, and other hints as to how the data should be displayed—as appropriate for the logic module application.

2.1.4 Layout Module

The layout module lays out the information output by the logic module, with an attempt to satisfy any hard or soft layout constraints that arrive as auxiliary information to the data. In the simplest case, the data is merely displayed in raster-scan order, scaled such that all of it fits on the screen. In more complex layouts, some data may be suppressed in favor of high-priority items, or the layouts may be fixed in a way that makes sense for the specific application run by the logic module.

It is noted that, as with the translation module, in some cases, the layout module may be unnecessary, or it may perform no processing, in this case simply passing the information output from the logic module to the display module. For example, assume that the logic module represents a graphics engine of some type that already performs the function of the layout module. In such a case the layout module is not needed and can be eliminated or made to pass on the logic module output unchanged.

2.1.5 Display Module

The display module takes layout information and other data (e.g., text, images, etc.) and converts them in a form that can be readily displayed on the display device being employed. The display module can support arbitrarily sophisticated levels of graphics, ranging from simple textual displays, html pages, to full 3D, dynamic elements combined with video.

2.1.6 Display Device

Any conventional display device can be used to implement the present shared display system and process, including, but not limited to, CRT monitors, LCD monitors, plasma screen monitors, projectors and associated projection screens, electronic whiteboards, and even calligraphic output displays (laser writer), as well as others, not restricted to standard rectangular displays. One preferred embodiment uses displays of exceptional size, including but not restricted to large LED displays such as can be found in metropolitan gathering spots such as Times Square in New York City or movie theater screens. For the purposes of the present invention, a shared display is generally defined as what multiple users view on any display device. In other words, all the users see the same image at any one point in time. Typically, this shared display would be at the same location, although this is not required. Rather, multiple displays at different locations all controlled via a link into the same logic module is a possibility. For example, imagine that the shared display is of a trivia game that is shown on display devices in a multitude of sports bars simultaneously, so that patrons could compete against each other nationwide. In addition, while typically the shared display would be viewed by the users on a single communal display device, this is also not a requirement of the present invention. For example, there could be multiple display devices within the same space each displaying the same image at any one time.

2.2 Alternate Architectures

The general architecture described above represents a generalized version of the architecture employed to implement the present shared display system and process in that it includes discrete modules for performing prescribed functions. However, it is not intended that the present invention be limited to the above-described general architecture. Rather, alternate versions of the architecture can be employed as appropriate for the particular application.

2.2.1 Modular Architecture

The foregoing general architecture lends itself to making the present shared display system modular such that modules can be swapped out to handle a variety of applications without significant impact on the remaining modules. For example, the input, translation, layout and display modules can be made generic so that they can be used by a variety of logic modules to input user data and control the shared display. In this way, the logic module could be swapped out for different applications, as desired. For example, logic modules for running an electronic bulletin board, games, auctions, voting/polling, shared browsing, artistic displays, as well as other applications, could be swapped out to control the shared display, without requiring the other modules to be changed.

Similarly, while it may be desirable to make the layout and display modules generic so that they can generate displays on a variety of different display devices as discussed previously, this may not always be practical given the divergent types of display devices available. An alternative is to make the layout and display modules swappable such that they can be changed for different displays. Thus the system and process can be customized to adapt to existing display devices no matter what the type. Layout and display modules can be made swappable to produce different appearances on the same display, as well. For example, this feature would be advantageous for generating a "draft mode" display for development purposes using layout and display modules that produce relative crude images, but at high speeds. Once development is complete, the layout and display modules would be swapped out with more sophisticated graphics programs to allow rendering of high resolution images, complex art and graphic designs, albeit at a slower rate.

Still further, in some applications, the translation of input data, processing performed by the logic module and the layout requirements will be so unique and interdependent that simply swapping out logic modules would not be feasible. In such cases, the input modules and display modules may remain the same, but the translation, logic and layout modules would be combined into a single unit referred to as an "application module" for the purpose of this description. These application modules could be swapped to allow for different display scenarios.

2.2.2 Architecture with Eliminated/Added/Merged Modules

Other variations in the general architecture for implementing the present shared display system and process involves eliminating, adding and/or merging modules. For instance, as indicated in the foregoing description, some applications do not require some of the described functions and the associated module could be eliminated. Further, additional modules could be added. For example, a separate translation module can be employed for each input mode, rather than the single translation module described in the general architecture for handling all input modes. Still further, modules may be merged with other modules to created combined modules. For example, the input and translation modules for a single input type may be merged into a single module, or the translation function could be handled as part of the logic module.

2.2.3 Architecture Employing Input/Output Modules

Another variation in the general architecture involves augmenting the above-described input modules with an output function to form input-output (I/O) modules which facilitate return communications with a user. In this variation, the I/O modules both accept inputs from users that are provided via the communication modality associated with the module, as well as send information back to the user via the same modality (assuming the modality allows for two-way communication) or via a different supported modality if desired by the user. This allows the logic module to send private messages to individuals via the appropriate I/O module, thereby providing an "out-of-band" dialog between the system and individual users. For example, a user could request instructions on how to input text for display, or on how to play a game running on the shared display. Further, a user could request an image, video, audio or document file be provided.

It is also noted that the present shared display system can be configured to include both input-only modules and I/O modules. Thus for some communication modalities only input is possible, while with the modalities associated with an I/O modules, both input and output is possible. This mixed module configuration allows for certain modalities not amenable to providing a feedback to the user, such as keyboards, computer mice and joysticks which are essentially input only devices.

2.2.4 Architecture Enabling Coordinated Inputs

In some of the potential applications implemented using the present shared display system and process, there will be a need to coordinate the input from the multiple users for timing purposes to avoid collisions and lost data. One way to accomplish this task using the general architecture described previously is to configure the input (and/or I/O) modules to time stamp all user inputs with the time of arrival of the message. Then the translation module would be assigned the task to queue to inputs via conventional methods for entry into the logic module based on their time stamps. However, another way to accomplish this task is to modify the general architecture (or any variation thereof described above) to allow cross-communication between the input (and/or I/O) modules to facilitate self regulation so that only one input at a time is provided to the translation module (or logic module if the translation module is not present). For example, the incoming messages could be time stamped as described above. Each input (and/or I/O) module would then coordinate with the other modules to ensure a time stamped message (or parsed portion thereof) is provided only after any message or portion thereof from another module with an earlier timestamp has been submitted first.

3.0 Exemplary Applications and Enhanced Features

The following sections describe a few exemplary applications that advantageously implement the above-described shared display system and process. The description of these applications is intended to aid in the reader in gaining a better understanding of the present invention, however it is not intended that the present invention be limited to just these application. Nor is it intended that the present invention be limited to just the communication modalities discussed. In addition, some useful features that have particular advantage for a particular application are described. However, these features can be advantageously employed for other applications and are not intended to be limited to just one type of application.

3.1 Communal Word Game

One exemplary application involves using a shared display to play a communal game. To simplify the description of this application assume the game is a word game where generally a user employs letters displayed on the shared display to form words which are input into the game, along with his or her identity.

To input words into the game, each user views the available letters from the shared display and uses whatever input device he or she has access to whose communication modality is supported by the system. For example, if email is a supported modality, the user can include the word in an email (such as in the subject line as suggested earlier). The identity of the user would also be included in the email, such as in the "From" line. Similarly, a word could be input by a user via an instant messaging (IM) modality. In this case the user's identity would be included in the "From" line and the word forms the message portion of the communication. If a Short Message Service (SMS) text messaging scheme is a supported modality of the system, the user could be required to provide their identity as usual for this type of messaging, and the word could be provided in the body of the message. It is noted that in the case of the email and IM input scenario, there may be no need for the translation module (if included) to perform any processing as the word is provided in text form which could be recognizable by the logic module directly. However, in the case of SMS text messaging the raw input is typically a string of numbers and symbols, which would be converted to text via the translation module (or by an input or logic module incorporating the translation function). The user identity and word could likewise be input via a prescribed protocol using standard telephone DTMF tones via a PBX. As in the case of SMS text messaging, these tones would need to be converted to text by the translation module (or by an input or logic module incorporating the translation function).

As words and user identities are input, the logic module processes them to run the game. For example, among other things the logic module would keep score by user, ensure a user's input is valid, generate hard and soft constraints pertaining to how a game board presenting the game should be displayed. The layout module in this exemplary application would then take the constraints and generate a layout for the display of the game in a conventional manner. The resulting display instructions would then be provided to the display module in order to generate the desired images on the shared display.

3.2 Voting/Polling Tool

Another exemplary application involves the implementation of a voting or polling tool using the present shared display system and process. The input modalities and module operations for this application are similar to the game scenario, with some notable additions and exceptions. For example, while the voting could involve the user inputting a prescribed letter, symbol or number to indicate a choice shown on the shared display, more complex inputs are also possible. For example, a user might input a keyword indicative of his or her choice. Further, a user might be allowed to suggest an additional choice. Thus, while the first input scenario could be handled just as in the game scenario, the later two would require a translation module (or translation function residing in the input or logic module) that is capable of correlating keywords to voting choices and identifying suggested new choices.

The logic module in this exemplary application keeps track of the topics and choices, and tallies the voting. In addition, the logic module would enforce voting rules, such as only allowing one vote per user for any one topic. The logic module could also assess and add new voting choices as suggested by a user.

Another useful feature that can be implemented in a voting tool application (as well as any of the other application described herein and others) is the ability to specify certain users as having special permissions. For example, users acting as moderators or administrators of the voting process could be given the ability to input commands to affect the voting choices displayed, end voting, or set up new voting scenarios. In other applications, such as the aforementioned gaming scenario, a user with special permissions could enter commands to affect the settings and parameters of the game or how it is displayed. Essentially, the ability of an authorized user to access and control the operations of the logic module in particular, but also the other modules, to effect changes, would be quite useful. Methods for identifying a user with special permissions are conventional and any appropriate technique can be implemented. One general example of how this might be done would involve first determining if the information input by the user includes a command that has been designated as requiring special permission to execute. If so, the user inputting the information is identified, and it is determined if the user is on a pre-established list of users with special permission to submit such a command. The command is executed only if the user is on the pre-established list.

Yet another useful feature that can be implemented is the use of a lottery. As an incentive for participation, a lottery could be administered among the participants to foster suspense and enjoyment. The lottery may or may not provide equal odds of winning to the participants. For example, just as in ticket lotteries, if a person has more than one ticket, his or her chances of winning are slightly higher than those who do not, greater participation or more information could improve a user's odds of winning. Once a winner has been selected, immediate feedback can be provided to the user either through the shared display or via a message to the input device.

3.3 Communal Web Browser

Yet another exemplary application involves the implementation of a communal web browser that displays user-requested web pages on at least a portion of the shared display and allows users to interact with the web pages (e.g., by allowing a user to select a link in a displayed page). Here again, the input modalities and module operations for this application are similar to the game scenario, with some notable additions and exceptions. To access a web page, users enter Urls to identify a web site they want to view on the shared display in the same way as text is entered for a word game or a keyword representing voting choice is entered (which may require translation in the case of SMS text messaging or telephone DTMF tone inputs). In addition, to facilitate the web browsing function, the logic module can annotate links within a displayed web page. In this way all a user has to do to access the link is to input the annotation. Other browser functionalities, such as inputting text into a form or double-clicking a user-interface element can be accomplished through the use of specialized commands. It is also noted that in the web browser application because in essence all that is displayed are web pages, there is no substantial need for the layout function, other than organizing the location of multiple pages on the screen-a function that could be readily handled by the logic or display module. Thus, in this application the layout module (if present) can be by-passed.

3.4 Electronic Bulletin Board

An electronic bulletin board is another example of an application suited to implementation via the present shared display system and process. Once again, the input modalities and module operations for this application are similar to the game scenario, with some notable additions and exceptions. For instance, while text for display on the shared display is entered in a similar manner as described previously, a bulletin board also often includes images, files, videos and other media input by users; and which can be displayed or downloaded (e.g, via the aforementioned output-capable embodiment of the present invention). An email-based input modality is ideal for inputting and obtaining these non-text media items. Also, the identity of a user posting to an electronic bulletin board can sometimes be anonymous in such applications. Thus, the user identity collecting function described previously might be disabled or not included for this application, if desired. Another useful feature for a bulletin board application involves the managing the posted items in regard to the amount of time they remain on the shared display. For example, the logic or layout module can be configured to assign time limits to displayed data, so that it disappears or fades out over time.

Another useful feature that can be implemented in a bulletin board application (as well as any of the other application described previously and others) is the ability to maintain an internal history of all messages sent to the shared display, as well the ability identify, log, and keep track of unique users (assuming the user identity is captured from the inputs), as well as what they input or request, and when it was provided or requested. This archived data would then be available for data mining purposes, or for enforcing rules of the application (e.g., only one posting per user, or in the case of the aforementioned voting tool application tracking the users' identities to allow only one vote per user).

Wherefore, what is claimed is:

1. A system for controlling a shared display, comprising:
   a general purpose computing device comprising a display device; and a computer program comprising program modules executable by the computing device, comprising,
   a plurality of input modules each providing a different communication modality, and which collectively input information from multiple users, and wherein each input module comprises a translation sub-module which takes the user-inputted information input into that input module and converts it into commands or requests that are recognizable to a logic module,
   the logic module comprising an application which based on the user-inputted information generates display instructions and data, wherein said user-inputted information comprises at least one of video data or audio data or document data,
   a layout module which based on the display instructions and data from the logic module generates layout instructions and packages data for display, and
   a display module which receives the layout instructions and data from the layout module and employs the same to display content in the shared display on the display device.

2. The system of claim 1, wherein the computer program further comprises a translation module which takes the user-inputted information provided by the input modules and converts it into commands or requests that are recognizable to the logic module, whenever said user-inputted information is in a form not recognizable to the logic module.

3. The system of claim 2, wherein each input module comprises a timestamp sub-module which appends onto each message or a part thereof received from a user that is provided to the translation module, an indicator identifying the time the message was received, and wherein the translation module comprises a sub-module for queuing each message or portion thereof received from the input modules in an order based on its timestamp and providing the messages or parts thereof to the logic module in that order.

4. The system of claim 2, wherein each input module is in communication with each of the other input modules, and wherein each input module comprises a timestamp sub-module which appends onto each message or a part thereof received from a user that is provided to the translation module, an indicator identifying the time the message was received, and wherein each input module comprises a sub-module for coordinating with the other input modules to provide each message or portion thereof to the translation module only after any message or part thereof received by another input module with an earlier timestamp has been provided to the translation module.

5. The system of claim 2, wherein the layout and display modules are specialized so as to support a specific type of display device, and wherein the specialized layout and display modules are swappable with other specialized layout and display modules supporting other display device types such that the layout and display modules which support the type of display employed in the system are employed in lieu of other modules supporting other display device types.

6. The system of claim 2, wherein the translation, layout and display modules are generalized so as to support multiple swappable logic modules each representing a different application.

7. The system of claim 1, wherein the logic module comprises a translation sub-module which takes the user-inputted information provided by the input modules and converts it into commands or requests that are recognizable to the logic module.

8. The system of claim 1, wherein at least one of the input modules comprises an output sub-module which receives data from the logic module and outputs it to a user using the communication modality associated with the input module outputting the data.

9. The system of claim 8, wherein the user specifies in a message input into one of the input modules what data to output from the logic module and which input module having an output sub-module the data is to be output from.

10. The system of claim 8, wherein the data output to the user is at least one of (i) an image file, (ii) a video file, (iii) an audio file, (iv) a document file, or (v) text.

11. The system of claim 1, wherein each input module comprises a timestamp sub-module which appends onto each message or a part thereof received from a user that is provided to the logic module, an indicator identifying the time the message was received, and wherein the logic module comprises a sub-module for scheduling each message or portion thereof received from the input modules to be processed by the logic module based on its timestamp.

12. The system of claim 1, wherein each input module is in communication with each of the other input modules, and wherein each input module comprises a timestamp sub-module which appends onto each message or a part thereof received from a user that is provided to the logic module, an indicator identifying the time the message was received, and wherein each input module comprises a sub-module for coordinating with the other input modules to provide each message or portion thereof to the logic module only after any message or part thereof received by another input module with an earlier timestamp has been provided to the logic module.

13. The system of claim 1, wherein the communication modalities associated with the input modules comprise at least two of (i) email, (ii) short message service (SMS) text messaging, (iii) instant messaging (IM), (iv) DTMF tones, (v) keyboard output signals, (vi) pointing device output signals, (vii) still camera output signals, (viii) video camera output signals and (ix) voice.

14. The system of claim 1, wherein the layout and display modules are generalized so as to support multiple different types of display devices.

15. The system of claim 1, wherein the application associated with the logic module comprising one of (i) a computer game, (ii) an electronic bulletin board, (iii) a voting/polling tool, (iv) a web browsing tool, (v) a computer graphics program or (vi) a lottery tool.

16. The system of claim 1, wherein the display instructions provided by the logic module comprise data priorities specifying which data is to be displayed whenever there is not enough space on the shared display to display all the data provided can be displayed.

17. The system of claim 1, wherein the display instructions provided by the logic module comprise time limits specifying the length of time data displayed on the shared display is to remain displayed.

18. The system of claim 1, wherein the display instructions provided by the logic module comprise hard and soft constraints pertaining to the way the data should be laid out on the shared display.

19. The system of claim 1, wherein the input modules comprises sub-modules for:
parsing messages received from a user into discrete message units according to a prescribed parsing pattern; and
forwarding only those message units to the logic module which are pre-designated as containing information useful to the application associated with the logic module.

20. The system of claim 19, wherein said prescribed parsing plan is designed to separate out an indicator of the identity of the user contained in the message so as to form a message unit which is designated as the user's identity.

21. The system of claim 19, wherein said prescribed parsing plan is designed to separate out text or characters representative thereof from the message and form one or more message units which are designated as user text data.

22. The system of claim 19, wherein said prescribed parsing plan is designed to separate out an image from the message and form one or more message units which are designated as user image data.

23. The system of claim 19, wherein said prescribed parsing plan is designed to separate out video from the message and form one or more message units which are designated as user video data.

24. The system of claim 19, wherein said prescribed parsing plan is designed to separate out audio from the message and form one or more message units which are designated as user audio data.

25. The system of claim 19, wherein said prescribed parsing plan is designed to separate out a document file from the message and form one or more message units which are designated as user document data.

26. A computer-implemented process for controlling a shared display on a display device, comprising using a computer to perform the following process actions:
   establishing multiple input modalities to input information from multiple users, wherein at least one of the input modalities is characterized by a latency greater than about 1.0 second, and wherein said user-inputted information comprises at least one of video data or audio data or document data; and
   inputting the user information from the multiple input modalities to a single computer program which employs the user information to control the content displayed in the shared display on the display device, wherein each input modality translates the user-inputted information input into that input modality and converts it into commands or requests that are recognizable to said single computer program.

27. A system for controlling a shared display, comprising:
   a general purpose computing device;
   at least one display device showing the shared display; and
   a computer program comprising program modules executable by the computing device, comprising,
      a plurality of input modules each providing a different input modality at least one of which is characterized by a latency exceeding about 1 second, and which collectively input information from multiple users, wherein said user-inputted information comprises at least one of video data or audio data or document data,
      an application module which receives the user information from the input modules and which based on the information generates display layout instructions and packages data for display, and wherein the application module comprises a sub-module for archiving each unique screen shown on the shared display, and
      a display module which receives the layout instructions and data from the application module and employs the information and data to display content in the shared display on the display device.

28. The system of claim 27, wherein the application module comprises a sub-module for archiving user-inputted information.

29. The system of claim 27, wherein the application module comprises a sub-module for archiving the identity of each user inputting information to the system, as well as when the information was input and what information was input.

30. The system of claim 27, wherein at least one of the input modules comprises an output sub-module which receives data from the logic module and outputs it to a user using the communication modality associated with the input module outputting the data in response to a user inputted request for the data.

31. The system of claim 30, wherein the application module comprises a sub-module for archiving the identity of each user requesting data, as well as when the information was requested and what data was provided to the user.

32. The system of claim 27, wherein the application module comprises sub-modules for:
   determining if the information input by the user comprises a command that has been pre-designated to require special permission to execute;
   identifying the user inputting the information and determining if the user is on a pre-established list of user with special permission to submit said command;
   executing the command only if the user is on the pre-established list.

33. A computer-readable medium having computer-executable instructions for controlling a shared display on a display device, said computer-executable instructions comprising:
   establishing multiple input modalities to input information from multiple users, wherein at least one of the input modalities is characterized by a latency greater than about 1.0 second, and wherein said user-inputted information comprises at least one of video data or audio data or document data;
   inputting the user information from the multiple input modalities to a single computer program which employs the user information to control the content displayed in the shared display on the display device; and
   outputting data from the computer program to a prescribed group of users using one of more of the communication modalities.

* * * * *